Sept. 2, 1952  J. R. MORGAN ET AL  2,608,865
MANOMETER
Filed May 26, 1948
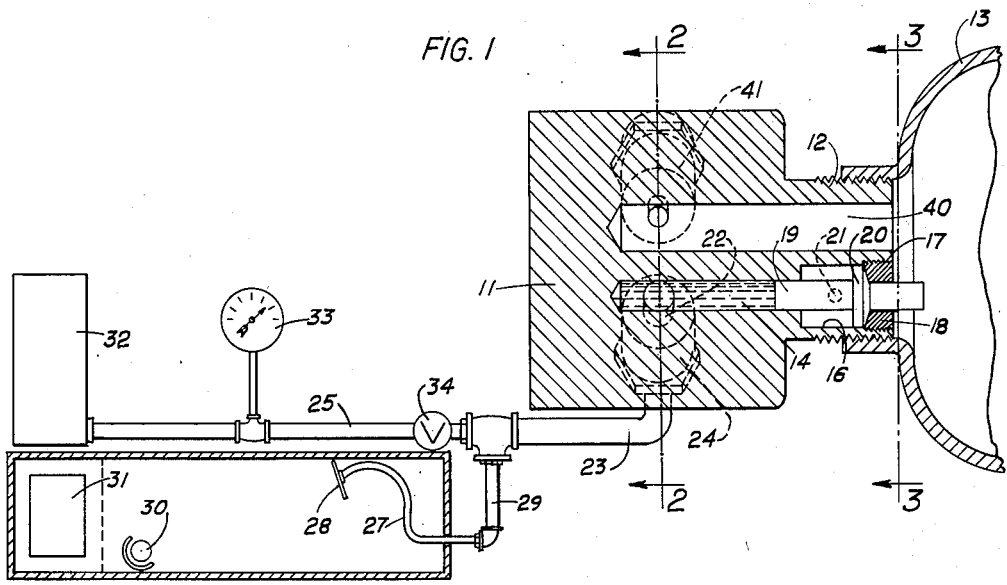
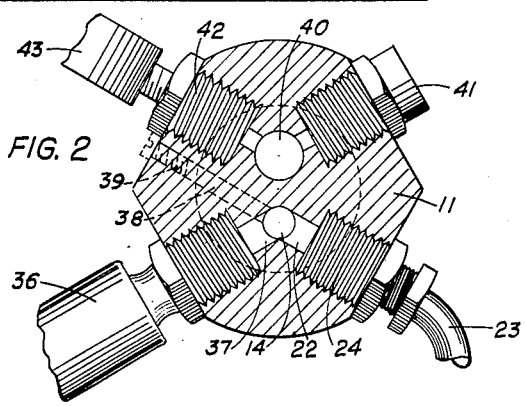
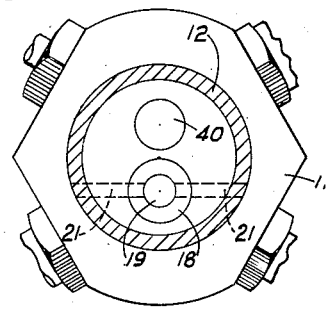
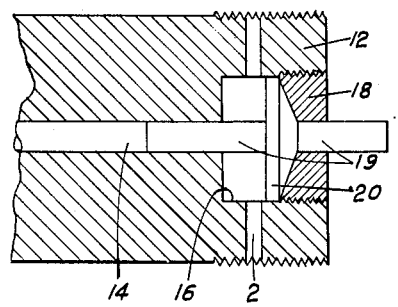
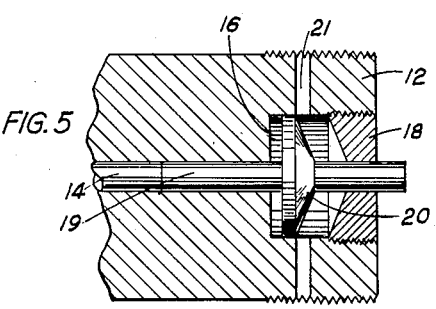
INVENTORS
JACK ROBERT MORGAN
NELSON E. ALEXANDER
EUGENE A. COMLEY
BY
ATTORNEY Patented Sept. 2, 1952

2,608,865

UNITED STATES PATENT OFFICE 2,608,865

MANOMETER

Jack Robert Morgan, New York, N. Y., Nelson Eugene Alexander, Mount Airy, Md., and Eugene Alexander Comley, Minneapolis, Minn., assignors to the United States of America as represented by the Secretary of the Navy Application May 26, 1948, Serial No. 31,788

1 Claim. (Cl. 73—391)

This invention relates generally to apparatus for measuring fluid pressures. In particular, it relates to an improvement in manometers for measuring the pressure generated in a rocket motor by the combustion of its propellant charge in static firing.

In testing rocket motors under static conditions two operational characteristics particularly noted are the pressures developed in the rocket motor by the combustion of its propellant charge and the period of time for which these pressures exist. The record of these pressure-time values thus obtained is of great importance as an aid to engineers and ballistics experts in determining the optimum size and weight of projectiles to be propelled by the particular motor tested, as well as in determining the effective range and approximate trajectory of the complete rocket projectile assembly.

One known method of obtaining a pressure-time record of the static firing of rocket motors includes connecting the interior of the motor chamber to a Bourdon tube pressure gauge having a mirror on its free end and making a photographic record of the movement of a light beam reflected by the mirror as the Bourdon tube moves in accordance with changes in pressure. When the Bourdon tube is calibrated against known pressures, and the photographic film is moved at a known rate for exposure to the light beam, a permanent and accurate pressure-time record can be obtained by this method. It is also known to fill the pipe system between the rocket motor and the Bourdon tube with a liquid, such as oil, to serve as a medium for gas pressure transmission. A serious disadvantage of the method just described is that the pressure transmission system must be flushed after each test to remove bubbles of combustion gases from the oil, and this, in turn, necessitates the repacking of strain gauges with grease after each test when such gauges are used.

It is one of the objects of this invention, therefore, to provide a direct pressure measuring device which will effectively prevent the penetration of the gases of combustion into the liquid pressure transmission system.

It is another object of this invention to provide a pressure measuring device which will permit the concurrent use in the pressure transmission system of electrical gauges of either the resistance-strain type or the condenser type.

The specific nature of this invention as well as other objects and advantages thereof will be clearly apparent from the accompanying drawings and the following description thereof. In the drawings:

Fig. 1 is a longitudinal sectional view of a preferred embodiment of the invention showing its relation to a rocket motor to be tested and a pressure recording device.

Fig. 2 is a cross-sectional view taken along line 2—2 of Fig. 1.

Fig. 3 is a cross-sectional view taken along line 3—3 of Fig. 1.

Figs. 4 and 5 are longitudinal sectional views of the piston arrangement employed in our invention.

Referring now to Fig. 1, it is seen that the pressure measuring apparatus there depicted comprises essentially a casing or body 11 having an externally threaded boss 12 adapted to receive the forward portion of a rocket motor 13. Parallel to the axis of the boss 12 is a passage delineating a cylinder 14, preferably of circular cross-section, having a portion of enlarged diameter defining a chamber 16 which is internally threaded at 17 at its open end. A threaded plug 18 having a central bore constituting an exit passage, equal in cross-sectional area to that of passage 14 and threaded into chamber 16 forms a partition between the latter and the rocket motor 13. A piston 19 having an enlarged diameter portion 20 is fitted snugly in the passage 14 and chamber 16, as shown, but movable longitudinally within the limits of chamber 16 under the influence of fluid pressure exerted at its ends. Ports 21 afford communication between chamber 16 and the atmosphere.

In a preferred design of our manometer a port 22 connects passage 14 with a fluid supply line 23 through the agency of a conventional connector plug 24 threaded into a tapped receptacle (undesignated) in the wall of casing 11. A Bourdon tube 27 fitted with a mirror 28 at its free end measures the pressures in supply line 23 and is connected therewith by a pipe 29. A light source 30 is adapted to cast a beam of light upon mirror 28 which, in turn, directs the light beam to a drum camera 31. Thus, a continuous trace of the light beam may be recorded the characteristics of which will depend upon the movement of the Bourdon tube in response to changes of pressure in supply line 23. A hydraulic pump 32 and a conventional pressure gauge 33 are provided in a branch 25 of line 23 and are used primarily for calibrating the Bourdon gauge 28. A valve 34 permits closing off branch 25 of line 23 when the pump 32 and gauge 33 are not in use.

Other hydraulic connections may be made with passage 14 as desired. For example, a strain gauge 36 may be connected to passage 14 through a port 37 and secured to the casing 11 by any conventional means, or a vent 38 may be provided for the purpose of bleeding air or gases from the hydraulic fluid and may be closed by a plug 39. A second passage 40 communicating with the rocket motor 13 is also preferably included in our manometer to permit the use of a safety valve as 41 designed to rupture at any predetermined pressure. An additional receptacle 42 communicating with passage 40 may be provided for an additional gauge as 43.

In operation, the chamber 14 and the line 23 and all its branches are filled with a hydraulic fluid, entrapped air or gases being removed through the vent 38. At the outset, piston 19 is in the position shown in Fig. 4 in which the portion 20 of the piston engages the plug 18 restricting any movement of the piston in that direction. In this position, the piston acts as a sealing valve and allows pressure to be built up in the chamber 14 and fluid supply line 23 and its branches. Calibration of the Bourdon tube 27 is then made by compressing the hydraulic fluid in line 23 and all its branches to a number of different pressures the highest of which will exceed that expected to be produced within the rocket motor by combustion of the propellant charge, and recording the deflections of the Bourdon tube in response to these pressures. True pressures are recorded continuously from the readings of gauge 33 and it is against these values of pressure that the photographic record of Bourdon tube deflection is calibrated.

After the calibration records are made, pressure in the system is relieved at pump 32 and the system permitted to return to atmospheric pressure with piston 19 remaining in the position shown in Fig. 4. Valve 34 is now closed.

As the propellant charge in the rocket motor 13 is consumed, tremendous pressures are generated therein and these, acting upon the exposed portion of piston 19, cause the piston to move deeper into passage 14 and into the position shown in Fig. 5. Since both ends of piston 19 are of equal area, the oil pressure equals the gas pressure in rocket motor 13 at all times. However, both the hydraulic fluid pressure and the gas pressure within the rocket motor will be greater than the pressure in chamber 16 since the latter is maintained at atmospheric pressure by means of the port 21. Thus, it is readily apparent that any leakage of combustion gases around that portion of piston 19 adjacent the rocket motor will be quickly eliminated from the system through the ports 21 and will not be forced into the liquid in chamber 14. Flushing the hydraulic system of combustion gases or air therefore becomes unnecessary.

While what has been described is particularly illustrative of a presently preferred embodiment of our invention, it is not intended that the scope of the invention be limited thereto but that it embrace any modifications and changes which fall within the true spirit of the invention, as covered by the appended claim, occurring to those skilled in the art.

We claim:

In a manometer comprising a Bourdon tube having a fluid therein and means for translating pressure flexing of said tube into visual indicia, the combination of a body having an end portion adapted to be attached to a vessel whose fluid pressure is to be measured, a chamber in said end portion opening outwardly and having its outer end internally threaded, a passage coaxially aligned with said chamber and extending from the bottom of the chamber inwardly of the body, means connecting said passage to said Bourdon tube, a plug threadedly engaged in the threaded end portion of said chamber, said plug being spaced from the bottom of said chamber and having a passage therethrough coaxially aligned with said first passage, said passages having equal cross-sectional areas, a piston having end portions slidably mounted in said first passage and the passage in said plug, respectively, and including an enlarged central portion slidably mounted in said chamber, the end portion of the piston slidably supported in said plug in operation being exposed to the interior of the vessel and the fluid whose pressure is to be measured, and means venting said chamber to the atmosphere whereby leakage of the fluid whose pressure is being measured into said chamber is vented to the atmosphere and thereby prevented from mixing with fluid in the Bourdon tube.

JACK ROBERT MORGAN.
NELSON EUGENE ALEXANDER.
EUGENE ALEXANDER COMLEY.

REFERENCES CITED

The following references are of record in the file of this patent:

UNITED STATES PATENTS

| Number | Name | Date |
|---|---|---|
| 1,380,575 | Merritt et al. | June 7, 1921 |
| 1,462,570 | Gelatt | July 24, 1923 |
| 1,828,093 | Ailman | Oct. 20, 1931 |
| 2,313,610 | Yowell | Mar. 9, 1943 |

FOREIGN PATENTS

| Number | Country | Date |
|---|---|---|
| 436,397 | Germany | Nov. 1, 1926 |